United States Patent [19]

Kanda

[11] Patent Number: 4,762,102
[45] Date of Patent: Aug. 9, 1988

[54] INTAKE DEVICE OF AN INTERNAL COMBUSTION ENGINE

[75] Inventor: Mutsumi Kanda, Susono, Japan

[73] Assignee: Toyota Jidosha Kabushiki Kaisha, Aichi, Japan

[21] Appl. No.: 102,678

[22] Filed: Sep. 30, 1987

[30] Foreign Application Priority Data

Nov. 4, 1986 [JP] Japan .......................... 61-168163[U]

[51] Int. Cl.$^4$ .......................... F02B 31/00; F02F 1/42
[52] U.S. Cl. .......................... 123/188 M; 123/52 M; 123/302; 123/306
[58] Field of Search ............... 123/188 M, 52 M, 302, 123/432, 306, 308

[56] References Cited

U.S. PATENT DOCUMENTS

| | | |
|---|---|---|
| 4,344,394 | 8/1982 | Showalter ........................ 123/188 M |
| 4,438,741 | 3/1984 | Okumura et al. ............... 123/188 M |
| 4,466,395 | 8/1984 | Kato et al. ....................... 123/188 M |
| 4,478,182 | 10/1984 | Nakanishi et al. .............. 123/188 M |
| 4,481,915 | 11/1984 | Nakanishi et al. .............. 123/188 M |
| 4,481,916 | 11/1984 | Nakanishi et al. .............. 123/188 M |

*Primary Examiner*—Raymond A. Nelli
*Attorney, Agent, or Firm*—Parkhurst & Oliff

[57] ABSTRACT

An intake device of an engine comprising an intake passage which is common to a first intake valve and a second intake valve. The intake passage is divided into a first straight passage and a second straight passage by a dividing wall which extends toward a point upstream of the intake passage from a position between the first intake valve and the second intake valve. A downwardly projecting separating wall is formed on the upper wall of the intake passage. The separating wall extends from a position upstream of the upstream end of the dividing wall toward a point upstream of the intake passage along the axis of the first straight passage. An intake control valve is arranged between the separating wall and the side wall of the intake passage, which is located on the second straight passage side.

8 Claims, 1 Drawing Sheet

INTAKE DEVICE OF AN INTERNAL COMBUSTION ENGINE

BACKGROUND OF THE INVENTION

1. Field of the Invention

The present invention relates to an intake device of an internal combustion engine.

2. Description of the Related Art

In an attempt to improve volumetric efficiency when the engine is operating under a heavy load and to create a strong swirl motion in the combustion chamber when the engine is operating under a light load, an internal combustion engine is known in which a common intake passage is provided for a first intake valve and a second intake valve, which valves are arranged adjacent to each other (see Japanese Unexamined Utility Model Publication No. 60-92733). In this engine, the common intake passage is divided into a first intake passage and a second intake passage by a dividing wall which extends to a point upstream of the common intake passage from a position between the first intake valve and the second intake valve. A separating wall projecting downward from the upper wall of the intake port is formed in the intake passage. This separating wall extends along the axis of the first intake passage from a position around the valve step of the first intake valve to the central portion of the common intake passage beyond the upstream end of the dividing wall, i.e., upstream of the intake passage. An intake control valve, which is open when the engine is operating under a heavy load, is arranged between the upstream end of the separating wall and the side wall of the common intake passage, which is located on the second intake passage side. One of the passage portions of the first intake passage, which are formed by the separating wall, has a helical shape.

In this engine, when the engine is operating under a light load, the intake control valve is closed, and at this time, a large part of the air flows into the combustion chamber via the helically-shaped passage, and thus a strong swirl motion is created in the combustion chamber.

Another engine is known in which a separating wall projecting downward from the upper wall of the intake passage and extending along the axis of the intake passage is formed in the intake passage upstream of the intake valve (see Japanese Unexamined Utility Model Publication No. 59-154826). An intake control valve is arranged in one of passage portions of the intake passage, which are formed by the separating wall.

In this engine, when the engine is operating under a light load, the intake control valve is closed. At this time, air flows within the other passage portion of the intake passage, in which the intake control valve is not arranged. This air is caused to swirl along the curved circumferential wall formed around the valve stem of the intake passage, and thus a strong swirl motion is created in the combustion chamber.

However, in the engine disclosed in the above-mentioned publication No. 60-92733, one of the passage portions of the first intake passage, which are formed by the separating wall, is a helically shaped passage having a large flow resistance, in order to create a strong swirl motion within the first intake passage. In addition, since the separating wall extends approximately over the entire length of the first intake passage, the intake passage has a large flow resistance. Consequently, in this engine, a problem occurs in that a high volumetric efficiency cannot be obtained when the engine is operating under a heavy load at a high speed.

Conversely, in the engine disclosed in the above-mentioned publication No. 59-154826, although only one intake valve is provided for each cylinder, the separating wall has a short length, and one of the passage portions of the intake passage, which are formed by the separating wall, is not a helically-shaped passage having a large flow resistance. Consequently, in this engine, a high volumetric efficiency can be obtained when the engine is operating under a heavy load at a high speed.

However, since this engine is provided with only one intake valve, it is not provided with a dividing wall, as disclosed in the above-mentioned publication No. 60-92733. Consequently, even if such a separating wall, as disclosed in the publication No. 60-92733, is applied to the construction of the intake passage disclosed in the above-mentioned publication No. 59-154826, a problem arises in that a high volumetric efficiency will not be obtained if the positional relationship between the dividing wall and the separating wall is not precise.

SUMMARY OF THE INVENTION

An object of the present invention is to provide an internal combustion engine capable of obtaining a high volumetric efficiency when the engine is operating under a heavy load and capable of creating a strong swirl motion in the combustion chamber when the engine is operating under a light load.

According to the present invention, there is provided an intake device of an internal combustion engine having at least one cylinder equipped with a first intake valve and a second intake valve which are arranged adjacent to each other, said intake device comprising: an intake passage which is common to said first intake valve and said second intake valve; a dividing wall extending in said intake passage from a position between said first intake valve and said second intake valve towards a point upstream of said intake passage and dividing said intake passage into a first straight passage and a second straight passage, said dividing wall having an upstream end which is furthest from both said first intake valve and said second intake valve; a separating wall projecting downward from an upper wall of said intake passage and having a bottom wall which is spaced from a bottom wall of said intake passage, said separating wall extending in said intake passage from a position upstream of said upstream end of said dividing wall towards a point upstream of said intake passage along an axis of said first straight passage; valve means arranged between said separating wall and a side wall of said intake passage, which is located on said second straight passage side, and actuating means actuating said valve means in response to a load of the engine to open said valve means when the load of the engine is higher than a predetermined load and close said valve means when the load of the engine is lower than said predetermined load.

The present invention may be more fully understood from the description of a preferred embodiment of the invention set forth below, together with the accompanying drawings.

DESCRIPTION OF A PREFERRED EMBODIMENT

Figure 1:
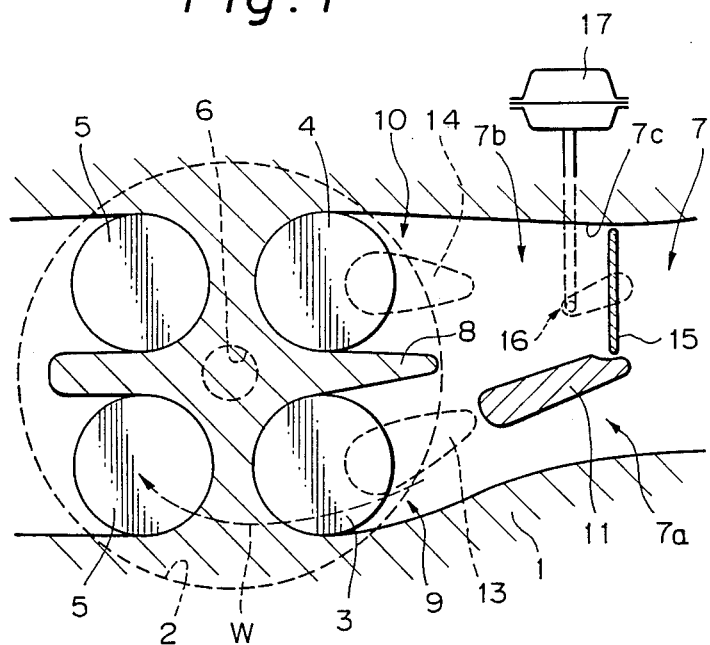
FIG. 1 is a cross-sectional plan view of a cylinder head.
Figure 2:
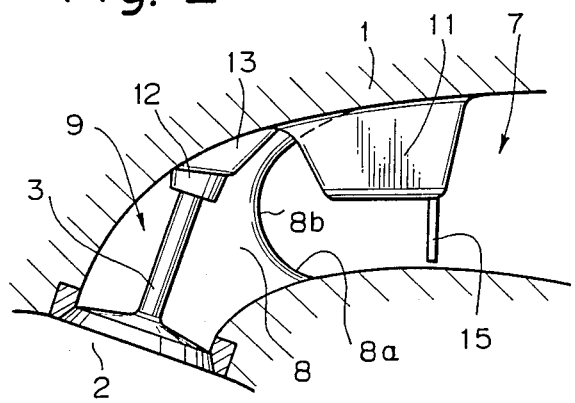
FIG. 2 is a cross-sectional side view of the cylinder head illustrated in FIG. 1.

Referring to FIGS. 1 and 2, reference numeral 1 designates a cylinder head, 2 a combustion chamber, 3 a first intake valve, and 4 a second intake valve; 5 designates exhaust valves, 6 a spark plug, and 7 an intake passage which is common to the first intake valve 3 and the second intake valve 4. A dividing wall 8 extending from a position between the first intake valve 3 and the second intake valve 4 toward a point upstream of the intake passage 7 is formed in the intake passage 7, and the intake passage 7 is divided into a first straight passage 9 and a second straight passage 10 which are shaped in the form of straight ports by means of the dividing wall 8. As illustrated in FIG. 2, the upstream end 8a of the dividing wall 8 extends archwise over the entire length between the upper wall and the bottom wall of the intake passage 7.

A separating wall 11 projecting downward from the upper wall of the intake passage 7 is formed in the intake passage 7. This separating wall 11 extends along the axis of the first straight passage 9 from a position upstream of the central portion 8b of the upstream end 8a of the dividing wall 8 to the central portion of the intake passage 7 toward a point upstream of the intake passage 7. Consequently, the downstream end of the separating wall 11 is spaced from the central portion 8b of the upstream end 8a of the dividing wall 8 by a given distance in the axial direction of the intake passage 7. Projections 13 and 14 projecting downward from the upper walls of the first straight passage 9 and the second straight passage 10 and extending toward the axial directions of the first straight passage 9 and the second straight passage 10 are formed around the stem guides 12 of the first intake valve 3 and the second intake valve 4, respectively. As illustrated in FIG. 1, the separating wall 11 is aligned with the projection 13 formed in the first straight passage 9. The bottom wall of the separating wall 11 is spaced from the bottom wall of the intake passage 7, and thus an air flow space is formed between the bottom wall of the separating wall 11 and the bottom wall of the intake passage 7. The intake passage 7 is divided into two passage portions by the separating wall 11 so that an eccentric air-flow passage 7a is formed opposite to the dividing wall 8, and a large cross-sectional passage 7b is formed on the dividing wall side. An intake control valve 15 having the shape of a butterfly valve is arranged between the upstream end of the separating wall 11 and the side wall 7c of the intake passage 7, which is located on the second straight passage side. That is, the intake control valve 15 is arranged in the inlet of the large cross-sectional passage 7b. The intake control valve 15 is connected to an actuator 17 via a link mechanism 16 and controlled by the actuator 17 so that the intake control valve 15 is fully open when the engine is operating under a heavy load, but is closed when the engine is operating under a light and middle load, as illustrated in FIGS. 1 and 2. Consequently, the actuator 17 may be formed by a vacuum-operated diaphragm apparatus having a vacuum chamber which is connected to the intake passage 7.

As mentioned above, when the engine is operating under a light or middle load, the intake control valve 15 is closed. At this time, a large part of the air flows into the eccentric air-flow passage 7a. After passing through the eccentric air-flow passage 7a, this air flows along the side wall of the first straight passage 9, which is located opposite to the dividing wall 8, and then flows into the combustion chamber 2 in the circumferential direction thereof, as illustrated by the broken line W in FIG. 1. As a result, a strong swirl motion is created in the combustion chamber 2.

When the engine is operating under a heavy load, the intake control valve 15 is fully open as mentioned above. Consequently, at this time, air also flows into the combustion chamber 2 from the large cross-sectional passage 7b having a small flow resistance. As mentioned above, since the first straight passage 9 and the second straight passage 10 are shaped in the form of a straight port having a minimum flow resistance, the flow resistance of the intake passage 7 is small, and thus a high volumetric efficiency can be obtained.

Where the separating wall 11 is elongated in the downstream direction so that the downstream end of the separating wall 11 extends to the interior of the first straight passage 9, since the length of the eccentrical air-flow passage 7a is increased, the flow resistance is increased. In addition, since an air flow passage having a narrow width is formed between the separating wall 11 and the dividing wall 8, the flow resistance is considerably increased. However, in the present invention, since the separating wall 11 is arranged upstream of the central portion 8b of the upstream end 8a of the dividing wall 8, that is, since the separating wall 11 does not extend to the interior of the first straight passage 9, the entire cross-section of the first straight passage 9 can be used as an air flow passage, and thus it is possible to obtain a high volumetric efficiency. In addition, the alignment of the projection 13 with the separating wall 11 contributes to the improvement of the volumetric efficiency.

According to the present invention, it is possible to improve the volumetric efficiency when the engine is operating under a heavy load and to create a strong swirl motion in the combustion chamber when the engine is operating under a light load by constructing both the passage portions divided by the dividing wall so that they have the shape of straight port, and by forming the separating wall so that it is arranged in the intake passage upstream of the dividing wall.

While the invention has been described by reference to a specific embodiment chosen for purposes of illustration, it should be apparent that numerous modifications could be made thereto by those skilled in the art without departing from the basic concept and scope of the invention.

I claim:

1. An intake device of an internal combustion engine having at least one cylinder equipped with a first intake valve and a second intake valve, which are arranged adjacent to each other, said intake device comprising:
    an intake passage which is common to said first intake valve and said second intake valve;
    a dividing wall extending in said intake passage from a position between said first intake valve and said second intake valve towards a point upstream of said intake passage and dividing said intake passage into a first straight passage and a second straight passage, said dividing wall having an upstream end which is furthest from both said first intake valve and said second intake valve;

a separating wall projecting downward from an upper wall of said intake passage and having a bottom wall which is spaced from a bottom wall of said intake passage, said separating wall extending in said intake passage from a position upstream of said upstream end of said dividing wall towards a point upstream of said intake passage along an axis of said first straight passage;

valve means arranged between said separating wall and a side wall of said intake passage, which is located on said second straight passage side, and actuating means actuating said valve means in response to a load of the engine to open said valve means when the load of the engine is higher than a predetermined load and close said valve means when the load of the engine is lower than said predetermined load.

2. An intake device according to claim 1, wherein said upstream end of said dividing wall extends archwise from the upper wall of said intake passage to the bottom wall of said intake passage.

3. An intake device according to claim 2, wherein said upstream end of said dividing wall has a central portion centrally arranged between the upper wall and the bottom wall of said intake passage, and said separating wall extends from a position upstream of said central portion of said upstream end toward a point upstream of said intake passage.

4. An intake device according to claim 1, wherein said separating wall extends to a central portion of said intake passage toward a point upstream of said intake passage.

5. An intake device according to claim 1, further comprising a valve guide for said first intake valve, and a projection formed on an upper wall of said first straight passage around said valve guide, said projection extending along the axis of said first straight passage and being aligned with said separating wall.

6. An intake device according to claim 1, wherein said valve means is arranged between an upstream end of said separating wall and said side wall of said intake passage.

7. An intake device according to claim 1, wherein said valve means comprises a butterfly valve.

8. An intake device according to claim 1, wherein said actuating means comprises a vacuum operated diaphragm apparatus.

* * * * *